R. W. ASHLEY & F. OBERKIRCH.
VEHICLE WHEEL RIM.
APPLICATION FILED AUG. 11, 1916.
1,219,065.
Patented Mar. 13, 1917.
2 SHEETS—SHEET 2.
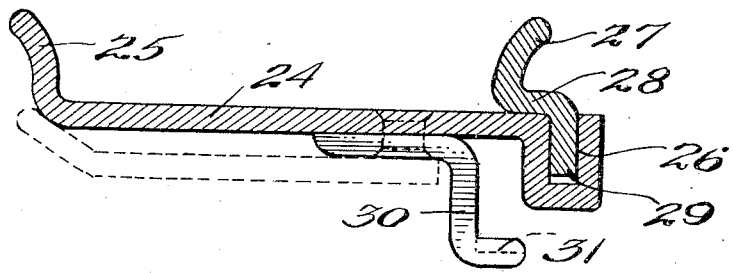
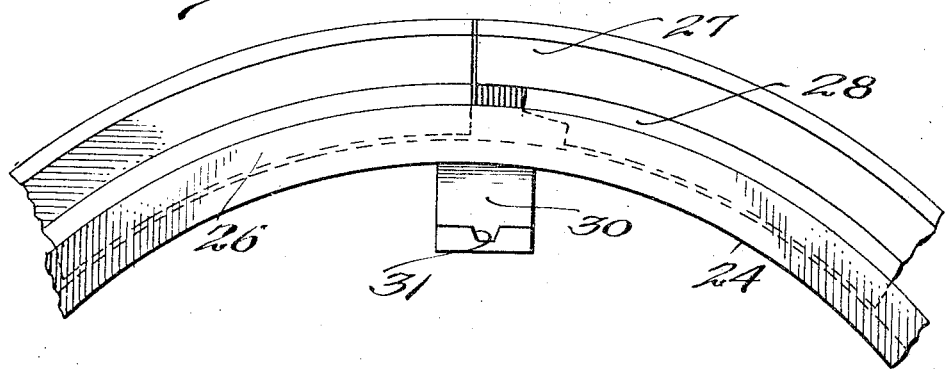
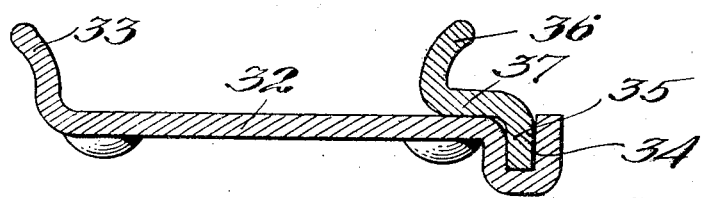
INVENTORS:-
Robert W. Ashley
and Frank Oberkirch.

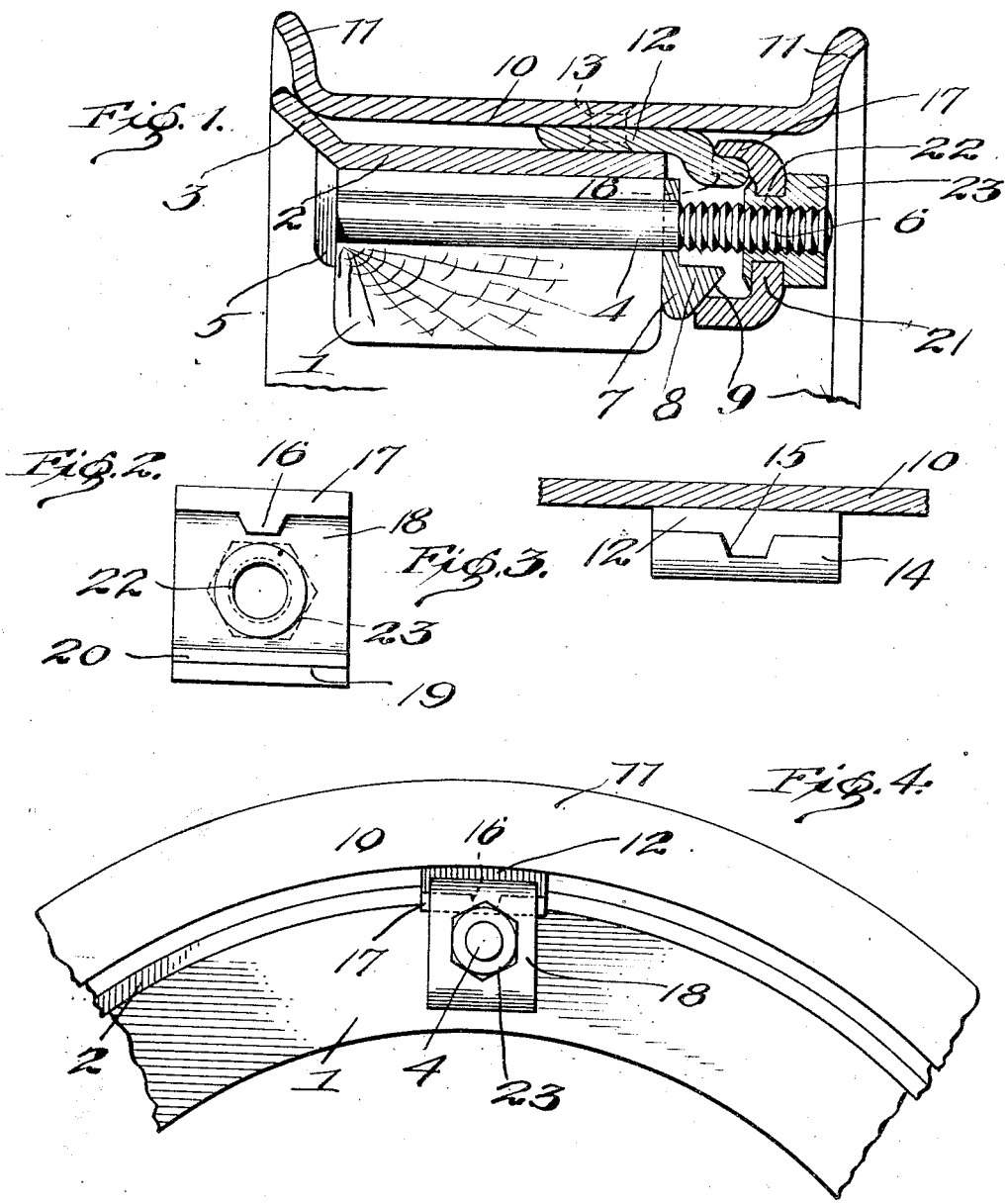

UNITED STATES PATENT OFFICE.

ROBERT W. ASHLEY AND FRANK OBERKIRCH, OF NEW YORK, N. Y.

VEHICLE-WHEEL RIM.

1,219,065.  Specification of Letters Patent.  Patented Mar. 13, 1917.

Application filed August 11, 1916. Serial No. 114,369.

*To all whom it may concern:*

Be it known that we, ROBERT W. ASHLEY and FRANK OBERKIRCH, citizens of the United States, residing at New York city, in the county of New York and State of New York, have invented new and useful Improvements in Vehicle-Wheel Rims, of which the following is a specification.

The invention relates to improvements in demountable rims for motor vehicle wheels and has particular reference to that type of rim utilizing a detachable top or tire carrying rim, having associated therewith a plurality of locking retaining means adapted to receive a plurality of locking traction means arranged for engagement with a plurality of locking reception means associated with the wood felly and felly band of a motor vehicle wheel.

The object of the invention is the providing of a felly band and wheel felly having mounted therein a plurality of supporting bolts, and having mounted thereon a plurality or reception locking plates, and a top or tire carrying rim having rigidly mounted thereon a plurality of reception locking cleats, each cleat thereof being provided with means for receiving a plurality of traction locking plates mounted on said plurality of supporting bolts, each locking plate thereof being provided with means for exerting upon said top rim a contractive seating action and means for maintaining the annular position of said top rim, and means for preventing the circumferential movement of said top rim on said felly band.

In the following is described in connection with the accompanying drawing one embodiment of the invention, the features thereof being more particularly pointed out hereinafter in the claims.

In the drawings, Figure 1 is a cross sectional view of the rim assembly; Fig. 2 is a rear elevation of one of the traction locking plates; Fig. 3 is a face elevation of one of the traction locking cleats mounted on the under surface of the top or tire carrying rim; Fig. 4 is a detail face elevation of the structure as illustrated in Fig. 1 of the drawings; Fig. 5 is a detail cross sectional view of a modified form of top or tire carrying rim illustrating in connection therewith the split side ring or detachable flange type of rim having mounted thereon the plurality of locking retaining cleats; Fig. 6 is a detail face elevation of the structure illustrated in Fig. 5 of the drawings; and Fig. 7 is a cross sectional view of a channel type of top rim illustrating in connection therewith a new form of detachable split spring side ring for rims particularly applicable for use as felly bands for wire wheels and like structures.

Similar numerals of reference indicate similar parts throughout the several views.

In the drawings (1) indicates a wood felly having mounted thereon a felly band (2) provided at its rear edge with a conical shaped reception bead (3). Said wood felly (1) has mounted therein a plurality of standard bolts (4) provided with heads (5) engaging said felly band (2) at the rear edge thereof, said bolts (4) at their outer ends thereof being threaded as at (6) to receive suitable locking means hereinafter described. (7) indicates one of a series of locking plates provided with a suitable aperture adapted to fit over the ends of bolts (4) and is arranged to be attached to wood felly (1) by any suitable manner such as by wood screws or other suitable means, and has formed thereon an enlarged head (8) provided with a diagonally inclined reception surface (9).

(10) designates a top or tire carrying rim provided at its respective edges with tire beads (11) and having fastened on its under surface thereof a plurality of locking cleats (12) fastened thereto by means of rivets (13) and having formed on their outer edges thereof a depending hook (14) having suitably cut or formed therein a reception groove (15) adapted to receive the depending projection or key (16) formed on the hook end (17) of traction locking plates (18), the lower end of said plates thereof having formed thereon inwardly projecting hooks (19) provided with abutting surfaces (20) adapted to engage and ride upon the diagonally inclined surfaces (9) on locking plates (7). Said traction locking plates (18) have formed therein apertures (21) which receive a plurality of sleeves (22) on lock nuts (23), the same being held therein by means of punching the projecting ends of said sleeves (22) back upon themselves in engagement with the inside surfaces of the locking plates (18). By arranging traction locking plates as hereinabove shown and described a positive locking means is provided wherein in actuating same there is exerted upon the top or tire carrying rim a contractive seating action and when the parts are locked together the engagement of key (16) in grooves (15) in the respective locking plates provides a positive traction means or means for preventing any circumferential movement of the top rim (10) on the felly band (2) and further provides a locking means adapted to prevent and obviate entirely radial expansive movement of the top rim as well as lateral wedging movement of said top or tire carrying rim.

Referring to Fig. 5 of the drawings, the structure therein shown comprises a top or tire carrying rim (24) having formed on its rear edge thereof a tire bead (25) and at its front edge a depending channel (26) adapted to receive a detachable split side ring (27) having formed therein a supporting shoulder (28) and a depending flange (29) engaging said channel (26), and having fastened on its inner surface thereof a plurality of locking cleats (30) provided with reception slots (31) adapted to receive means associated with a demountable rim structure for exerting upon said top rim a contractive seating action to bind said rim to a suitable felly band.

Referring to Fig. 7 of the drawings, the structure as shown therein comprises a top rim (32) provided at its rear edge with a tire bead (33) and at its front edge with a depending channel (34) adapted to receive the supporting flange (35) formed on split spring detachable side ring (36) which has formed therein a supporting shoulder (37) adapted to ride upon the outer periphery of the top rim (32) when in spring engagement with the channel (34) thereof. In straight side types of tire rims heretofore there has been great difficulty found in the shearing action caused upon the spring side ring and by constructing a side ring such as that shown in Fig. 7 of the drawings the shearing moment on the side ring is entirely obviated and a strong and efficient split side ring provided, and further a split side ring for rim structures particularly adapted for use in connection with wire wheels owing to the fact that the body of the rim adjacent the channel (34) must be punched into cuts to receive the nippled ends of the spokes, the supporting shoulder (37) being arranged to cover the greater part of the cupped area of the rim at particularly its front edge thereof, this type of structure has proven efficient for all types of wire wheel formations, and the side ring type as shown of great value owing to its strength and the factor of safety in preventing displacement of said ring by any natural action of the wheel to which it may be applied.

The structure may be varied in many ways without departing from the general spirit of the invention and we do not limit ourselves to the specific forms as shown, and described.

What we claim and desire to secure by Letters Patent of the United States is:

1. A device of the character described comprising, a wood felly, a felly band mounted thereon, a plurality of supporting bolts mounted in said wood felly, a plurality of locking plates mounted on said wood felly adjacent said plurality of bolts, a demountable rim engaging said felly band, a plurality of locking cleats mounted on said demountable rim, a plurality of locking traction means mounted on said plurality of bolts engaging said locking plates and locking cleats adapted to exert upon said demountable rim a contractive seating action, and means mounted on said locking traction means engaging means on said plurality of locking cleats adapted to prevent circumferential movement of said demountable rim on said felly band.

2. A device of the character described comprising a wood felly, a felly band mounted thereon, a plurality of supporting bolts in said felly band, a plurality of locking plates mounted on said wood felly adjacent said plurality of bolts, a demountable rim engaging said felly band, a plurality of locking cleats mounted on said demountable rim, a plurality of locking traction means mounted on said plurality of bolts engaging said locking plates and locking cleats adapted to exert upon said demountable rim a contractive seating action to distort same and force it into contact at a plurality of points on one edge and circumferentially at the opposite edge of said felly band, and means mounted on said locking traction means engaging means on said plurality of locking cleats adapted to prevent circumferential movement of said demountable rim on said felly band.

3. A device of the character described including a locking traction means for demountable rims comprising a cleat provided with a reception groove, and a traction locking plate having rotatively mounted therein a nut and having formed on its upper and lower edges thereof hooks, one of said hooks being provided with a locking key adapted to engage the reception groove on said cleat.

In witness whereof, we have hereunto signed our names in the presence of two subscribing witnesses.

ROBERT W. ASHLEY.
FRANK OBERKIRCH.

In the presence of—
E. E. HAINES,
M. HARTT.